US009235375B2

(12) United States Patent
Byers

(10) Patent No.: US 9,235,375 B2
(45) Date of Patent: Jan. 12, 2016

(54) RETAIL DIGITAL SIGNAGE

(71) Applicant: Cisco Technology, Inc., San Jose, CA (US)

(72) Inventor: Charles Calvin Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 13/679,573

(22) Filed: Nov. 16, 2012

(65) Prior Publication Data

US 2014/0139548 A1     May 22, 2014

(51) Int. Cl.
*G09F 3/20*      (2006.01)
*G06Q 30/02*     (2012.01)
*G06F 3/14*      (2006.01)

(52) U.S. Cl.
CPC .......... *G06F 3/1431* (2013.01); *G06Q 30/0281* (2013.01); *G09F 3/208* (2013.01); *G09G 2370/022* (2013.01); *G09G 2370/16* (2013.01); *G09G 2380/04* (2013.01)

(58) Field of Classification Search
CPC ............... H04N 21/2542; H04N 21/47815; G09F 3/208; G09F 7/00; G09F 19/18; G06F 3/0488; G06Q 30/0256; G06Q 30/0257; G06Q 30/0267
USPC ........... 345/619, 699, 85, 204, 418, 173, 156, 345/207; 705/14.65, 14.54; 353/28; 382/291; 235/375, 383, 385
See application file for complete search history.

(56) References Cited

U.S. PATENT DOCUMENTS

| 7,457,262 | B1  |   | 11/2008 | Doshi et al.            |
|-----------|-----|---|---------|-------------------------|
| 7,810,041 | B2  |   | 10/2010 | Rao et al.              |
| 7,916,690 | B2  |   | 3/2011  | Doshi et al.            |
| 8,542,906 | B1  | * | 9/2013  | Persson et al. .... 382/291 |
| 2002/0167500 | A1 | * | 11/2002 | Gelbman ............ 345/204 |
| 2007/0023511 | A1 | * | 2/2007  | Smith et al. ........ 235/385 |
| 2007/0024551 | A1 | * | 2/2007  | Gelbman ............. 345/85 |
| 2007/0181678 | A1 | * | 8/2007  | Nilsson et al. ...... 235/383 |
| 2008/0141166 | A1 |   | 6/2008  | Goldberg et al.         |
| 2009/0160883 | A1 | * | 6/2009  | Sonobe ............... 345/699 |
| 2012/0133623 | A1 | * | 5/2012  | Byun et al. .......... 345/207 |

(Continued)

OTHER PUBLICATIONS

"38" Long Stretched LCD Monitor LG, M3800S-BN Commerical Monitor, online site: http://www.lg.com/au/commercial-monitors/lg-M38005-BN-commercial-monitor, 1 page, printed Sep. 2012.
"Electronic Shelf Labels", Tagnetics, http://www.tagnetics.com, 1 page, (2008) printed Mar. 2013.

(Continued)

*Primary Examiner* — Chante Harrison
(74) *Attorney, Agent, or Firm* — Parker Ibrahim & Berg LLC; James M. Behmke; Kenneth J. Heywood

(57) ABSTRACT

In one embodiment, a plurality of digital displays is connected to a control computer having a processor and a memory. The memory is configured to communicate with the processor and has instructions that, in response to execution by the processor, cause the processor to prepare graphics information containing an identification of a retail product and a price for the retail product. The graphics information is sent to the plurality of digital displays and the digital displays display a product description and a product price based on the graphics information.

20 Claims, 10 Drawing Sheets

(56) References Cited

U.S. PATENT DOCUMENTS

| | | | |
|---|---|---|---|
| 2012/0169585 A1* | 7/2012 | Kim et al. | 345/156 |
| 2012/0192112 A1 | 7/2012 | Garrison et al. | |
| 2012/0256906 A1 | 10/2012 | Ross et al. | |
| 2012/0310744 A1* | 12/2012 | Kim et al. | 705/14.65 |
| 2012/0310757 A1* | 12/2012 | Kim et al. | 235/375 |
| 2013/0117153 A1* | 5/2013 | Shen | 705/26.9 |
| 2013/0176398 A1* | 7/2013 | Bonner et al. | 353/28 |
| 2014/0081753 A1* | 3/2014 | Mesaros | 705/14.54 |

OTHER PUBLICATIONS

"Spanpixel, 16.4" Sunlight Readable Digital Signage, 1366x256 Ultra Wide Aspect Ratio 16:3, Taiwan Trade, internet sitie: http://www.taiwantrade.com.tw/litemax/products-detail/en_US/549867/Spanpixel,_16.4%22_sunlight_readable_digital_signage,_1366x256_ultra_wide_aspect_ratio_16%3A3, 4 pages, printed Sep. 2012.

* cited by examiner

RETAIL DIGITAL SIGNAGE

TECHNICAL FIELD

The present disclosure relates generally to digital signage, and, more particularly, to pervasive digital signage for a retail environment.

BACKGROUND

High definition digital signage is becoming more common, especially in commercial and retail environments, and has a proven capability to influence customer behavior. Typical retail or commercial installations may include a few to a few dozen signs, most playing similar content. In a retail setting like a grocery store, for example, there may be a couple signs near the entrances, a set of signs near the cash registers, and perhaps a few sprinkled around the various departments highlighting high value/high margin goods.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
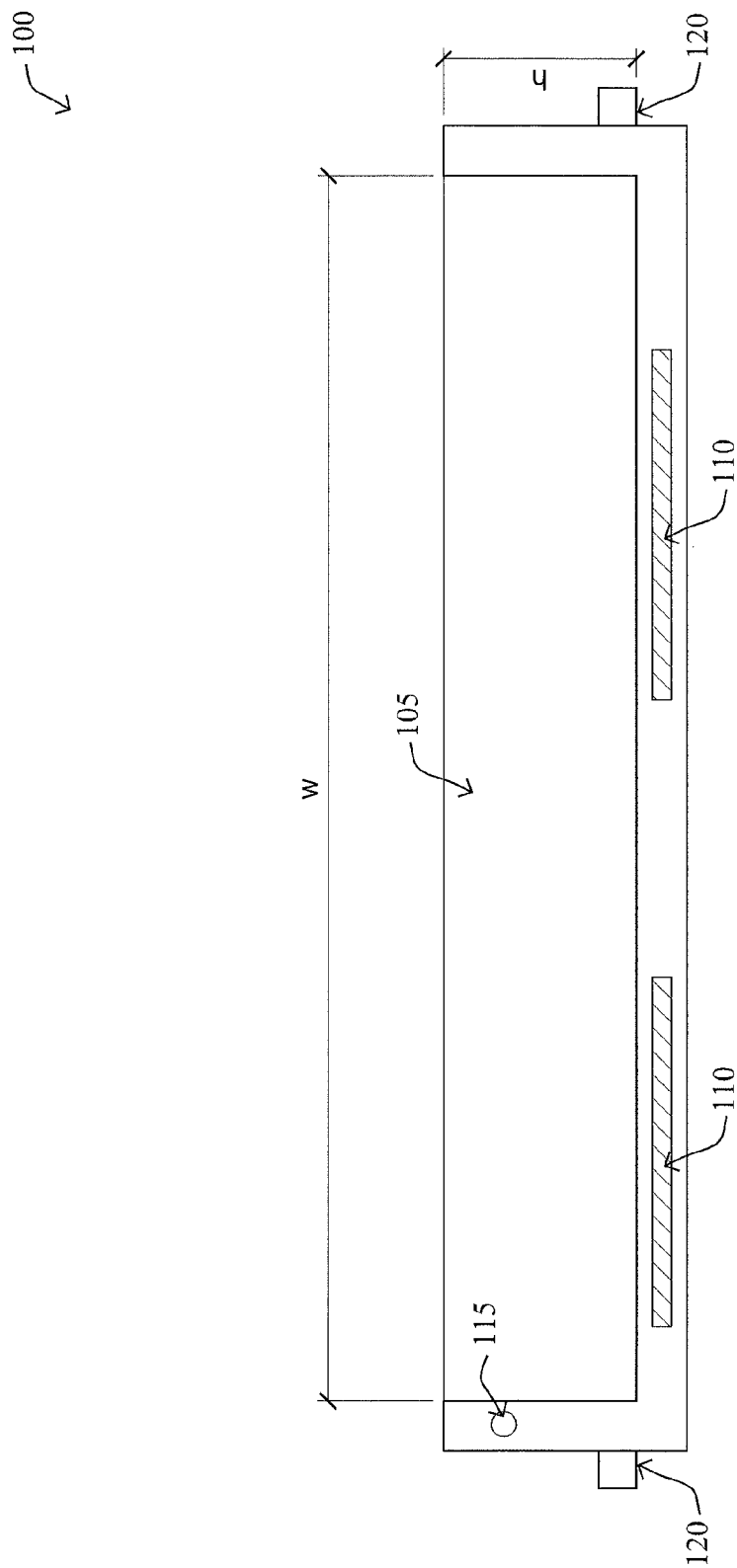
FIG. 1 illustrates an example digital display.

According to one or more embodiments of the disclosure, a plurality of digital displays are connected to a control computer having a processor and a memory. The memory is configured to communicate with the processor and has instructions that, in response to execution by the processor, cause the processor to prepare graphics information containing an identification of a retail product and a price for the retail product. The graphics information is sent to the plurality of digital displays and the digital displays display a product description and a product price based on the graphics information.

Description

Typical retailers, some having tens of thousands of different products on their shelves, face many challenges in their day-to-day operations. For example, retailers must somehow display or communicate to customers information regarding the different products offered for sale, such as prices, product descriptions, etc. One way to provide this information is through paper price tags positioned on the store shelves near the products. However, paper price tags are difficult to keep updated and are often subject to wear, theft, and vandalism. Every time a product is relocated, the retailer must make sure that the paper price tag is removed from the old location and placed in the new location for that product. Considering the number of products that are changed or relocated, for example during holiday seasons and during special promotions, keeping track of all of these price tags and verifying that each tag is correctly placed and has the current price and product description can be a daunting task. Another option is electronic shelf labels, which are also gaining popularity. However, even these electronic shelf labels must be moved with the individual products, must be manually updated, and are also subject to wear, theft, and vandalism.

A related issue is placement of product information, sales/promotional information, or attention-getting promotional messages (e.g., "buy two, get one free"; "buy these cookies, get a discount on milk"; etc.) near the products that they relate to. While printed cards, signs, banners, etc. placed near the products may work for this purpose, they have many of the same drawbacks as the paper price tag in that they must be manually updated and moved with the products and are also subject to wear, theft, and vandalism.

In addition to the above challenges, retailers must also address the challenge of guiding customers through the store and efficiently directing them to products of interest. It is difficult to direct customers unfamiliar with the store's layout to the correct section of the store or a particular shelf to find the products they need. Often retailers will have several staff members assigned to walk the aisles of the store ready to help direct customers through the store. Without this direction, customers often make many passes up and down each of the various aisles before they locate what they are looking for or can find everything on their list.

One technique that some retailers have used to try to provide product and sales/promotional information is through the use of digital signs (e.g., LCD, LED, plasma monitors or televisions, etc.), which are becoming quite common. However, these digital signs are typically installed only in high traffic areas like the entrances to retail stores, or in places where people are likely to pause for a few minutes, such as near bank teller positions, airport gates, or on gas pumps. In addition, due to the limited number and location of these digital signs, they can only provide limited information and do not address all of the challenges listed above, such as providing individual product descriptions, product prices, etc.

One possible way to address the limitations of using standard digital signs would be to install the standard digital signs at short intervals up and down each of the aisles, which would allow retailers to provide more information and direct the information to specified products in the vicinity of the individual digital signs. However, this raises problems as well. For example, typical digital signs have standard aspect rations (either 4:3 or 16:9), which is not optimal for attaching to store shelves, which would be the desired location to providing pricing and other information for individual products. Retailers could use small displays (e.g., approximately 4" diagonal size) to replace the typical paper price tags found on the front edge of shelves without hiding the merchandise, however, to have a sign in close enough proximity to each product to provide the desired information would require several digital signs per linear foot of shelf; or several hundred individual digital signs per aisle. This would be extremely costly and difficult to control. Alternately, larger displays (e.g., approximately 14" diagonal size) could be placed approximately every 4 feet along each aisle, giving ample screen area per displayed product. However, the large size of these digital signs would block products on the shelves and sacrifice too much shelf space, which is extremely valuable in a retail environment.

While there are some digital monitors available that have non-traditional aspect ratios, the size and aspect ratio of these digital monitors still present the same problems as those described above for digital signs with traditional aspect ratios.

The example systems and techniques described herein employ a number of digital signs having a unique size and aspect ratio connected to and controlled by media players and routers to blanket a retail environment and provide the information and services desired by retailers. Due to the unique size and aspect ratio, these digital signs do not hamper visibility, block access to the products on the shelves, or take up valuable shelf space. The examples described below may be most useful in "big box" retail environments (e.g., discount stores, grocery stores, home improvement centers, etc.), but could also be very valuable to medium and small retailers, and some service industries.

Various display technologies, such as plasma, LCD, OLED, projection, and others are capable of producing the resolutions required to provide the information and services required by retailer, and also of supporting the required color spaces, brightness, and aspect ratios. However, as discussed above, the current size and aspect ratios of these displays will not work efficiently in a retail environment. Some "double wide" digital signs have a 17:5 aspect ratio, which is about twice the width per unit of height as a traditional HD panel. However, the size and aspect ratio of these "double wide" panels are still too large to be used efficiently by retailers.

Therefore, rather than use standard size and aspect ratio displays, the examples herein use a much higher aspect ratio digital sign that is specifically sized for use in the retail environment. Where typical HD displays support 16:9 aspect ratios with a pixel array of 1920×1080, the example systems described below use a display having a 16:1 aspect ratio, which could have a pixel array of 1920×120. For example, this could be thought of as a one ninth horizontal slice of a traditional HD display. In production, the same mother glass used to make the very common 55" diagonal HD display panel (which measures approximately 48"×27") could be cut up into nine of these wide aspect ratio panels, each measuring 48"×3", with very few process changes. This panel size and aspect ratio could be used for big box retail environments, since the shelf units are typically 48" wide. The 3" height should also fit well in the front of shelf space usually reserved for price tags, without hanging down too low into the volume of the next lower shelf.

Referring to FIG. 1, according to one or more embodiments of the disclosure as described in detail below, a digital display 100 that can be used has a visible display area 105 having a height "h" of approximately 3 inches, a width "w" of approximately 48 inches, an aspect ratio of 16:1, and a pixel array of approximately 1920×120 (or a multiple thereof). Digital display 100 has one or more chaining connectors 120 and is preferably a LED, LCD, plasma, or other type of thin, flat panel display, but could be any type of display that will work for a particular application. Digital display 100 can also have a number of additional features, such as a touch interface that would allow customers to select options to learn more about a product, play videos, request a keyboard to enter information, etc. A low resolution (approximately 8 touch points per inch) would be required, but a higher resolution touch interface could also be used. Digital display 100 can also have one or more speakers 110 and/or a camera 115. Speakers 110 can be placed approximately 1 foot in from each end of digital display 100 and could be used for audio feedback, music, directional voice prompts or "barker" type advertisements. In addition, camera 115 could be used to take video of the shelves on the far side of the aisle, read bar codes/QR codes, or capture the activities of shoppers in the vicinity of camera 115.

Figure 2:
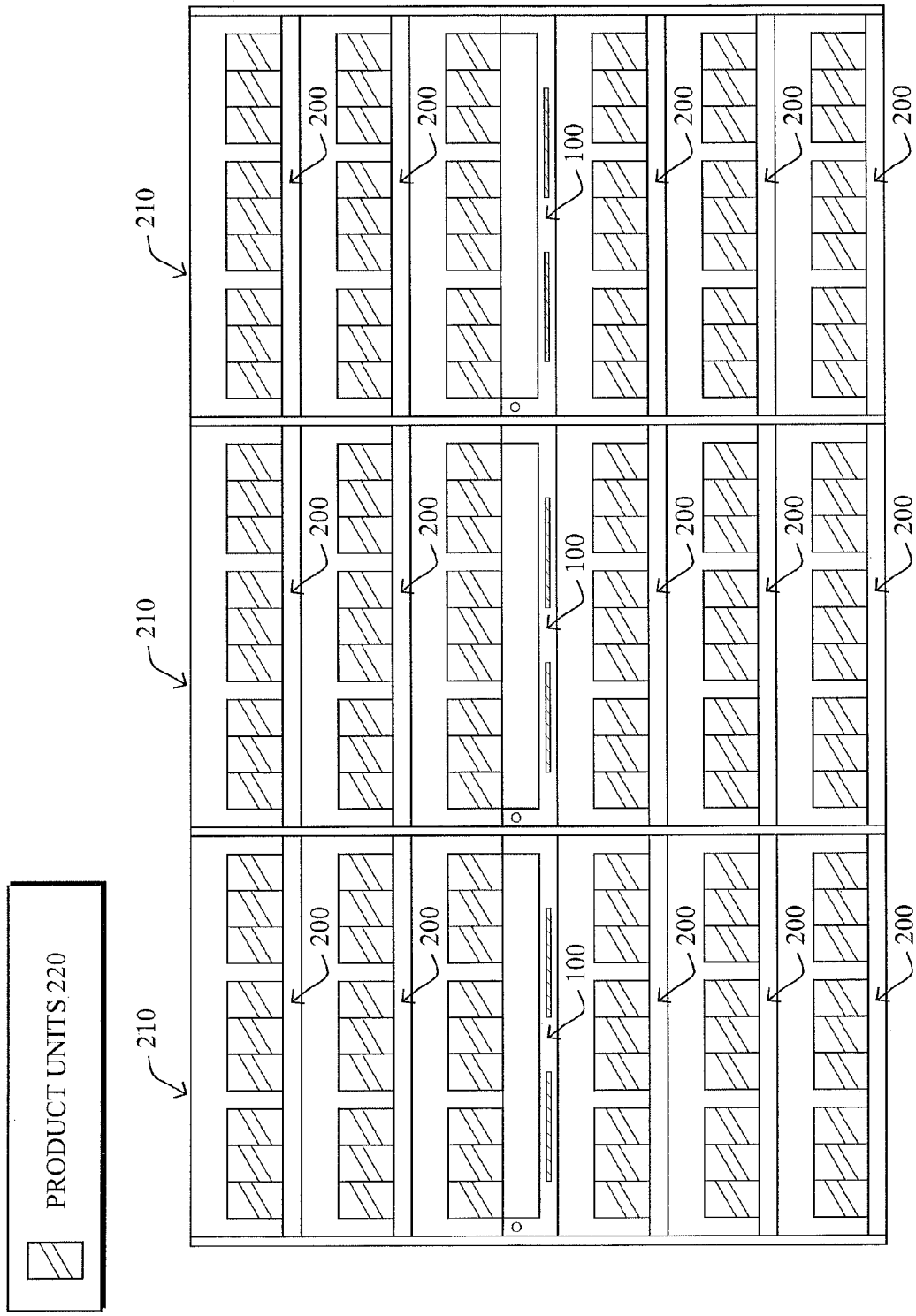
FIG. 2 illustrates an example of a number of digital displays mounted to shelving units in a retail environment.

Referring to FIG. 2, a continuous band of digital displays 100 can be installed up and down each aisle of a retail store. Each digital display 100 can be installed on a shelf 200 of each shelving unit 210 at approximately eye level, which would allow the digital displays 100 to be easily observed by customers and provide information regarding all of the products 220 on each shelving unit 210. For example, a typical "big box" retailer may have approximately 20 aisles, with each aisle being approximately 80 feet long. If each aisle were to use a continuous band of nominally 48 inch wide digital displays 100 on both sides of the aisle, to completely cover all shelf space would require forty digital displays 100 per aisle, or 800 for the entire store. Providing digital displays 100 on nearly all of the shelving units 210 of a retail store permits customers to be in close proximity to a digital display 100 no matter where they are in the store, insures that each product 220 offered for sale throughout the store has some dedicated screen area for information, and could improve customer convenience and create new revenue opportunities. These digital displays 100 could also be supplemented with a number of more traditional 16:9 aspect ratio signs near the entrances, in specialized departments, and near the checkouts.

Figure 3:
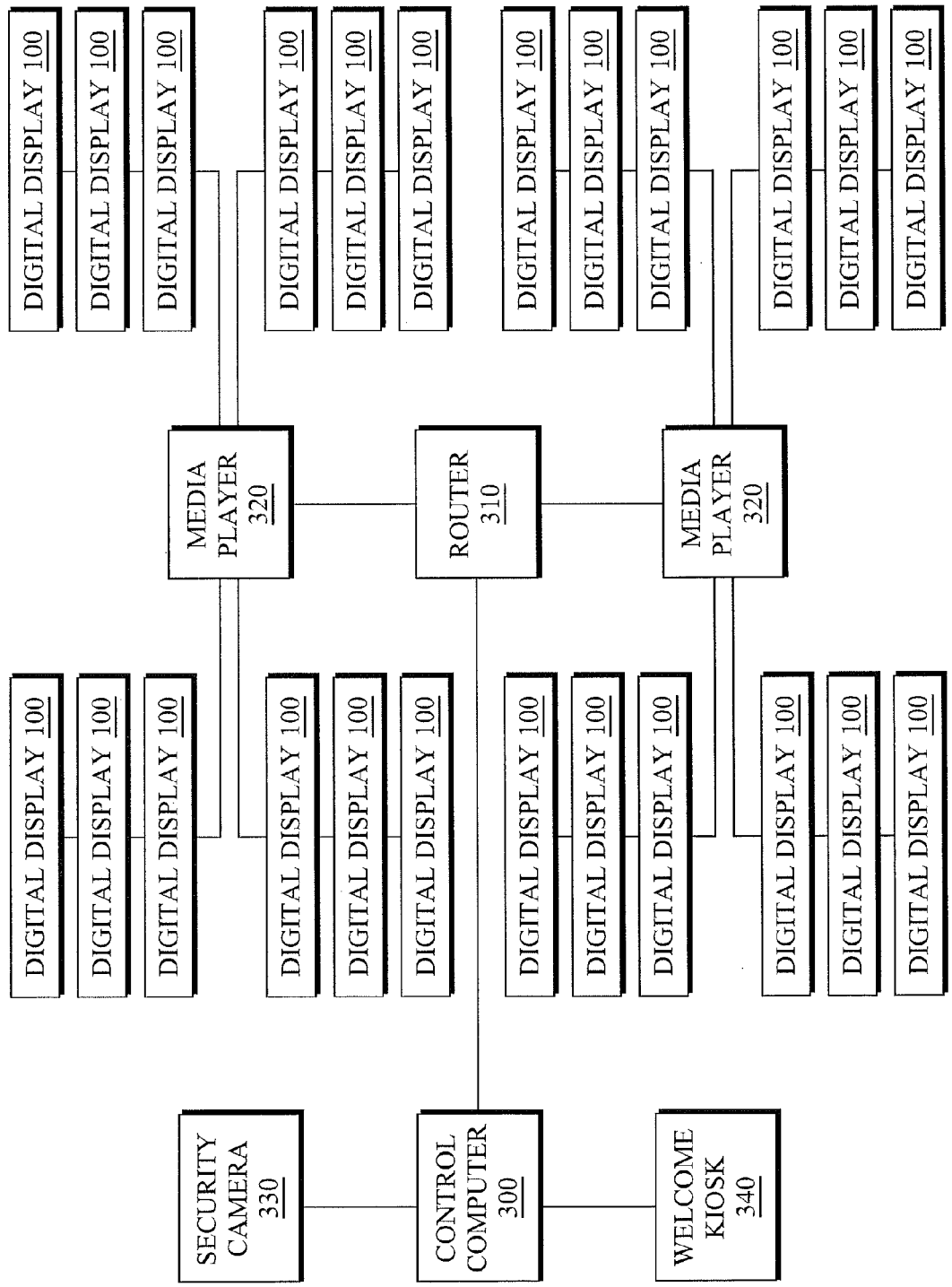
FIG. 3 illustrates and example system for retail digital signage.

Driving digital displays 100 in a large retail environment can be done by networking digital displays 100 with media players and routers connected to the store's control computer. Referring to FIG. 3, digital displays 100 are networked with a control computer 300 through routers 310 and media players 320 via a local network, such as a LAN, to provide an integrated, customizable, and highly engaging shopping experience. Additional peripherals, such as security cameras 330 and welcome kiosks 340 can also be networked with control computer 300 to further customize the capabilities of the system, as described in more detail below. Those skilled in the art will understand that any number of digital displays 100, media players 320, routers 310, control computers 300, and other peripherals may be used and that the view shown herein is for simplicity. Also, those skilled in the art will further understand that while the system is shown in a certain orientation, the system is merely an example illustration that is not meant to limit the disclosure.

Groups of digital displays 100 can be daisy-chained using connectors 120 and multiple groups can be connected to a media player 320. Media player 320 produces a graphic/video output, such as a conventional 1080P output, which would be driven down the chain of digital displays 100. Each digital display 100 can have a configuration setting that selects its position in the chain and the particular group. For example, the first digital display 100 in a chain can display lines 1-120 of a 1080 line graphic/video, the second digital display 100 can display lines 121-140, etc. Alternative resolutions could also be used to support displays of different pixel array size or a different number of signs per chain or group. If a multi-head media player 320 is used, each media player 320 can drive enough digital displays 100 for approximately one aisle (approximately twenty media players 320 would be required for the example "big box" store described above). Media players 320 can be networked via Ethernet through routers 310 to central control computer 300, which would run the system software, calculate the graphics/video to display on all of the digital displays 100, and sends instructions to media players 320 to render the graphics/video on particular digital displays 100. Alternatively, media players 320 could be removed and the graphic/video generation logic can be integrated directly into digital displays 100. In this example, digital displays 100 could be linked directly to control computer 300 and suitable routers 320 using Power of Ethernet technology, which can provide both data and power over one cable.

Figure 4:
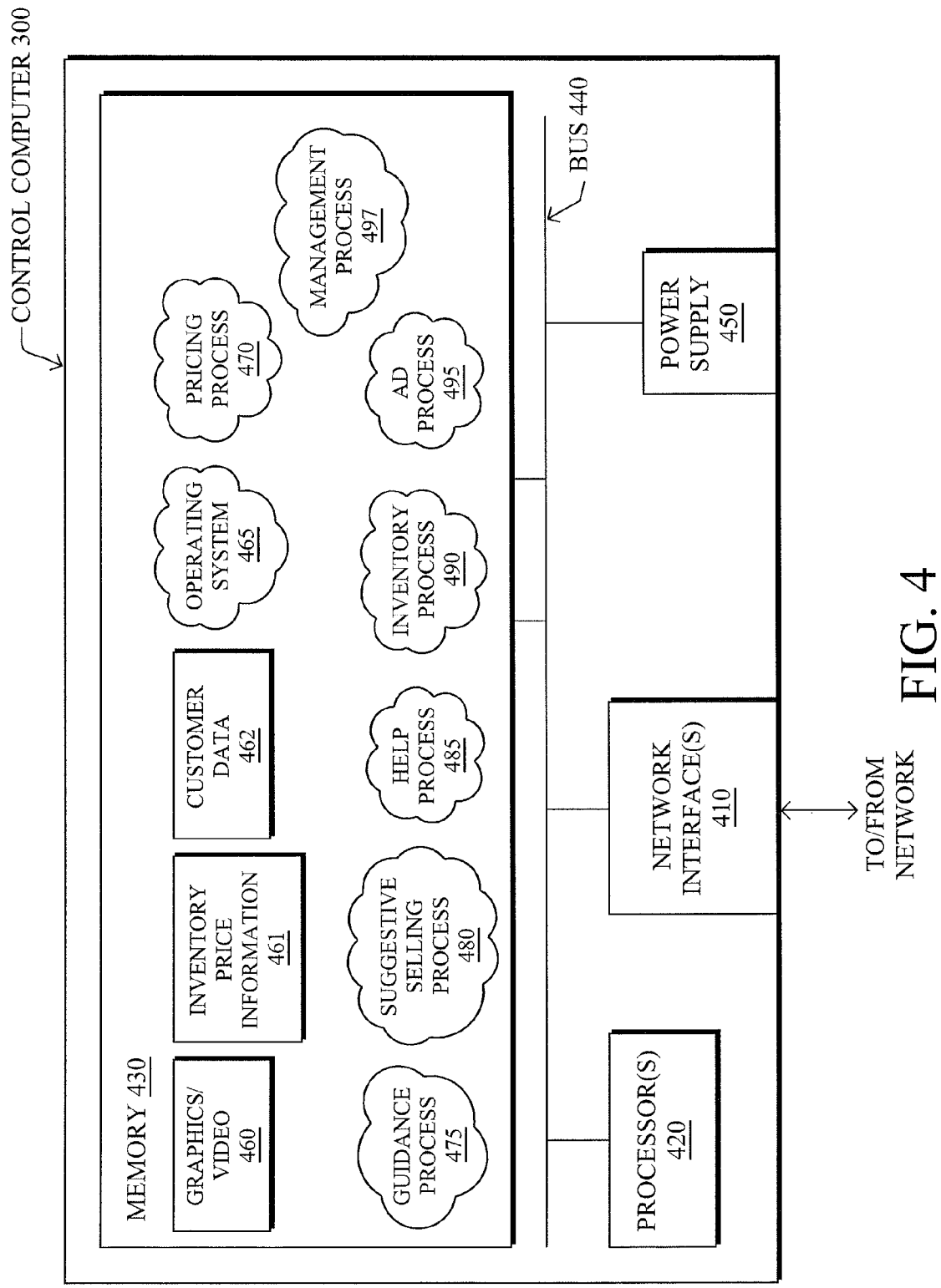
FIG. 4 illustrates an example control computer.

FIG. 4 is a schematic block diagram of an example control computer 300 that may be used with one or more embodiments described herein. Control computer 300 may comprise one or more network interfaces 410 (e.g., wired, wireless, power-line communication (PLC), etc.), at least one processor 420, and a memory 430 interconnected by a system bus 440, as well as a power supply 450 (e.g., battery, plug-in, etc.).

The network interface(s) 410 contain the mechanical, electrical, and signaling circuitry for communicating data to the network. The network interface(s) 410 may be configured to transmit and/or receive data using a variety of different communication protocols. Note, further, that control computer 300 may have two different types of network interfaces 410, e.g., wireless and wired/physical connections, and that the view herein is merely for illustration.

Memory 430 comprises a plurality of storage locations that are addressable by processor 420 and the network interface(s) 410 for storing software programs, graphics/video 460, inventory/price information 461, and customer data 462, associated with the embodiments described herein. Processor 420 may comprise hardware elements or hardware logic adapted to execute the software programs and manipulate the graphics/video 460. An operating system 465, portions of which are typically resident in memory 430 and executed by the processor, functionally organizes the device by, inter alia, invoking operations in support of software processes and/or services executing on control computer 300. These software processes and/or services may comprise a pricing process 470, guidance process 475, suggestive selling process 480, help process 485, inventory process 490, ad process 495, and/or management process 497, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. In addition, the techniques described herein may be performed by hardware, software, and/or firmware, which may contain computer executable instructions executed by processor 420 to perform functions relating to the techniques described herein.

The systems and techniques described herein can be used in many different service modes, which can provide customer service, new revenue opportunities, etc., for retailers, such as:
Price tag mode;
Guidance/tour mode;
Suggestive selling mode;
Special request mode;
Video help mode;
Inventory mode; and
Ad rental mode.

Depending upon the specific store, customer behavior, and marketing strategy, variants of these modes can be easily programmed and dynamically changed as needed. Some service modes can be used to make a customer's shopping experience more efficient, convenient, informative, or enjoyable, while others may allow retailers to support a large store with fewer employees stationed on the retail floor.

Price Tag Mode

Figure 5:
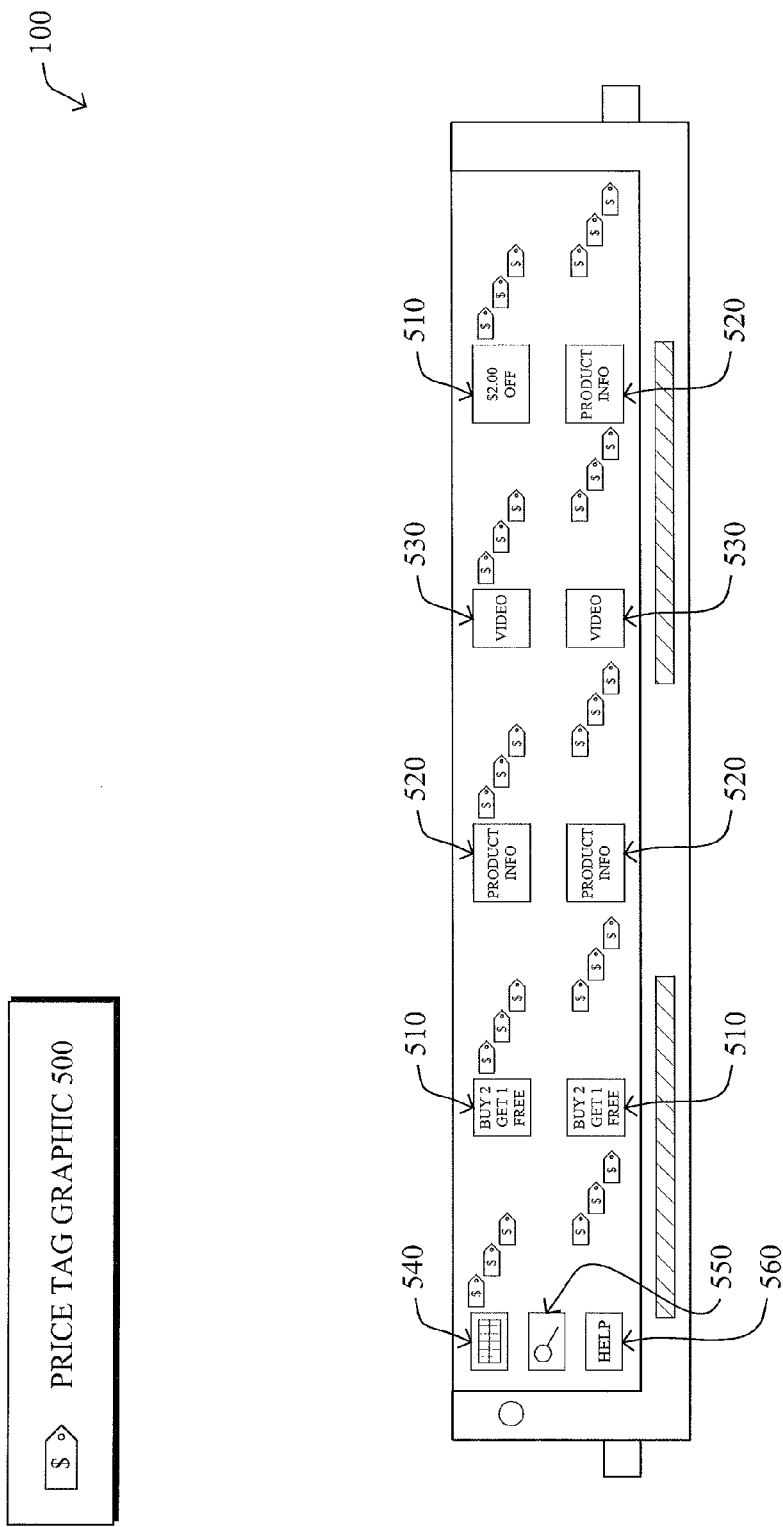
FIG. 5 illustrates an example digital display when used in price tag mode.

One example of a possible service mode is price tag mode. In price tag mode, control computer 300 can use pricing process 470 and inventory/price information 461 to prepare and send graphics/video 460 information related to products and pricing for display by digital displays 100. When used in a system such as that shown in FIG. 3, control computer 300 can send the information to a particular media player 320 associated with a particular set of digital displays 100, through router 310. Media player 320 can then generate the requested graphics/video pursuant to the information received and send the corresponding graphics/video to the appropriate digital displays 100. Alternatively, if the system does not use media players 320, such as the alternative discussed above, control computer 300 can send the information directly to digital displays 100, which would then process the information and display the graphics/video as appropriate. As shown in FIG. 5, based on the graphics/video 460 information sent by control computer 300, digital displays 100 can display price tag graphics 500, which can include product logos or names and a prices for each product stocked near each digital display 100. In the example shown, price tag graphics 500 are rendered as actual product price tags, with each tag arranged to correspond with a single item on shelves above or below digital display 100. In some aisles, up to eight levels of shelving could be stacked vertically with product and the digital displays 100 could be attached to the front of the fourth or fifth shelf from the bottom, so the price tag graphics 500 would be correspondingly arranged to insure each product has a corresponding price tag graphic 500 with its particular information. Since digital displays 100 show price tag graphics 500 for all the items located on the shelves and are controlled by central control computer 300, the information provided in price tag graphics 500 should never be missing or incorrect and can be instantly updated. The format, font, shape, color, border, and animation of price tag graphic 500 can also be customized per product to highlight specific products, for example those on sale. In addition to price tag graphics 500, other possible graphics/video 460 information could include information for special offer graphics 510, such as manufacturer's coupon offers, promotions, social networking tie-ins, etc., product information graphics 520, such as recipe suggestions, etc., or even full motion video advertisements 530 for selected products, which can be displayed in the space between price tags or in any other open space on digital displays 100. Control computer 300 can also send information to display a keyboard icon 540, which could bring up a touch keyboard display is for the user to type product searches, an interactive icon 550, which could allow the user to browse the Internet, scan a barcode, report out of stock items, send a message to a manager, create a video chat session, etc., or a help icon 560, which would allow a user to request human help.

If digital displays 100 include a touch interface, the system can be configured so that a user can make a selection using the touch interface and have displayed supplemental information, such as price per unit, SKU/barcode number, nutritional information, expiration dates, warnings, recommendations (e.g., the jelly in aisle 5 goes great with this peanut butter), etc. Upon receipt of a selection from a user, digital display 100 can send a selection message to control computer 300, through media player 320 and router 310, which includes information about the selection. Alternatively, if media players 320 are not used, digital displays 100 can send the information directly to control computer 300. Control computer 300 would then determine which information was requested by the user and send the requested graphic/video information back to the particular digital display 100 for display to the user.

Some of the benefits of using the described system with the price tag mode are elimination of various problems discussed above with paper price tags, the ability to place product information and advertisements in close proximity to the products they relate to (including full motion video), the ability to provide special promotions and user specific sales information, etc.

Guidance/Tour Mode

Another example of a possible service mode is guidance/tour mode. In guidance/tour mode, control computer 300 can use guidance process 475 and inventory/price information 461 to prepare and send graphics/video 460 information for display by digital displays 100 that can be used to guide a customer through the store. When used in a system such as that shown in FIG. 3, control computer 300 can send the information to a particular media player 320 associated with a particular set of digital displays 100, through router 310. Media player 320 can then generate the requested graphics/video pursuant to the information received and send the corresponding graphics/video to the appropriate digital displays 100. Alternatively, if the system does not use media players 320, control computer 300 can send the information directly to digital displays 100, which would then process the information and display the graphics/video as appropriate.

Figure 6:
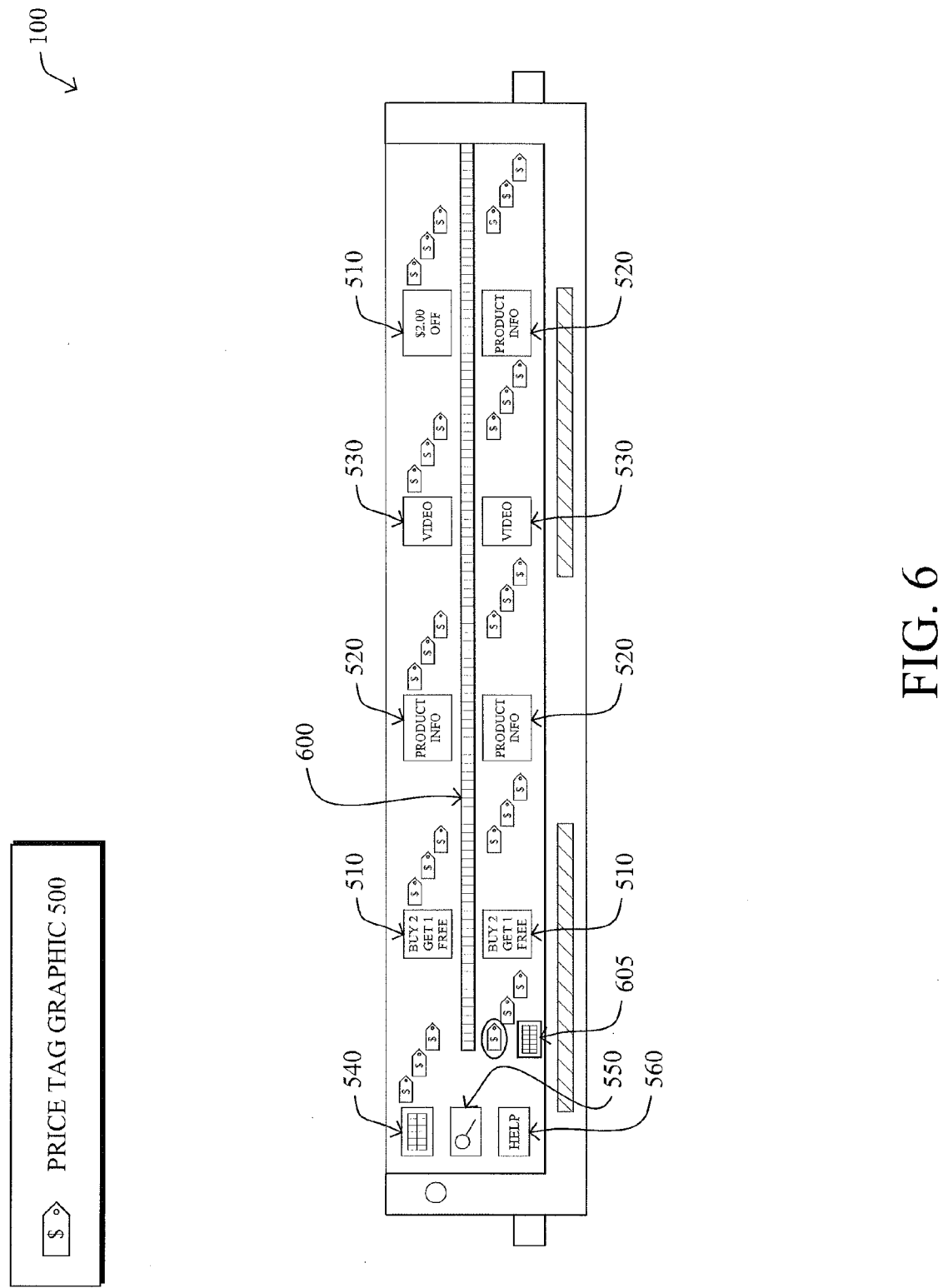
FIG. 6 illustrates an example digital display when used in guidance/tour mode.

For example, a customer can request the location of a specific item by initiating a search using a digital display 100, if equipped with a touch interface or other type of input device, a welcome kiosk 340, or possibly by using a website or app on a smartphone, which would communicate with control computer 300 via a wireless connection such as a Wi-Fi or cellular connection. For example, a customer at a home improvement store may be looking for PVC pipe. Based on the request received from the customer, control computer 300 determines the location of the desired item, determines the best route from the customer location to the item, and sends graphic/video 460 information to the appropriate digital displays 100 along the route to guide the customer to the requested item. For example, as shown in FIG. 6, control computer 300 can send graphic/video 460 information that will have the appropriate digital displays 100 add an animated path bar 600 to the displays between the current customer location and the shelf that has the desired item. If the system was being used in price tag mode, the animated path bar 600 can be added to the graphics/video displayed in the price tag mode (as shown in FIG. 6) or can temporarily replace the graphics/video from the price tag mode. The customer then follows the animated path bar 600 to the correct aisle, then to the correct location in the aisle, and finally to the correct shelving level to find the requested item.

Once the customer reaches the shelf with the item they requested, an attention-grabbing animation can be displayed that directs the customer to select the item. In addition, the customer can indicate that they have located the requested product by selecting a located icon 605 on digital display 100 or selecting the price tag graphic 500 for the item located. When this input is received from the customer, control computer 300 will send instructions to the appropriate digital displays 100 to remove animated path bar 600. Alternatively, rather than displaying animated path bars 600 along the entire path to the item and waiting for an indication from the customer that they have reached the requested product, this capability can be integrated with security cameras 330, so that only the digital displays 100 the customer can see in front of their current position display the animated path bar 600 and the animated path bar 600 is removed when it is determined that the customer has reached the desired location. Since several customers in a store are likely to be using guidance mode at any given time, numerous animated path bars 600 could be individually identifiable per customer, such as by different colors, patterns, etc.

In addition to guiding a customer to a single desired product, the system can also be configured to guide a customer through the store to find an entire list of desired items, a particular type of item, a particular category item, etc. For example, a customer may come to a store with a particular item list, a customer with dietary restrictions at a grocery store may be looking for low sodium or low fat items, or a customer at a discount store may be looking for a gift for a 14 year old girl in a certain price range. The customer can download an application for a home computer or mobile device, and enter a shopping list, recipe ingredient list, bill of materials, type of product, category of product, etc. using the application. Alternatively, the customer can use welcome kiosk 340 or a digital display 100 to enter the desired list or special request information while at the store, if either or both are equipped with a touch interface or other input device. The customer can then send the list or special request information to control computer 300 over a network, such as the Internet, from the application or, upon arrival to the store, go to a welcome kiosk 340 and upload the list or information from the device via any well known communication means, such as a Wi-Fi or cellular connection, scanning of a QR code, etc. The user may also be allowed to select a custom color scheme or pattern for the animated path bar 600.

Based on the list or special request information received from the customer, control computer 300 determines the locations of all the items on the list or all of the items that meet the special request criteria, determines the most efficient route through the store to find all of the items (e.g., by using the traveling salesman algorithm, as is known in the art), and sends graphic/video 460 information to the appropriate digital displays 100 along the route to guide the customer to the first item. For example, as shown in FIG. 6 and described above, control computer 300 can send graphic/video 460 information that will have the appropriate digital displays 100 add an animated path bar 600 to the display between the current customer location and the shelf that has the first item on. The customer then follows the animated path bar 600 to the correct aisle, then to the correct location in the aisle, and finally to the correct shelving level to find the first item.

Once the customer reaches the shelf with the first item they requested, an attention-grabbing animation can be displayed, such as a flashing of the price tag for the desired item, that directs the customer to select the item. The customer can then indicate that they have located the first requested product by selecting a located icon 605 on digital display 100 or selecting the flashing price tag graphic 500. When this input is received from the customer, control computer 300 will send instructions to the appropriate digital displays 100 to remove animated path bar 600 to the first item and display a new animated path bar 600 from the location of the first item to that of the second item on the list. Alternatively, rather than waiting for an indication from the customer that they have reached the requested product, this capability can be integrated with security cameras 330 or cameras 115 in digital displays 100, so that the animated path bar 600 to the first item is automatically removed and the new animated path bar 600 to the second item is displayed automatically when it is determined that the customer has reached the desired location. This process continues until all of the items on the list have been selected by the customer or an item meeting the special request has been found.

Suggestive Selling Mode

Figure 7:
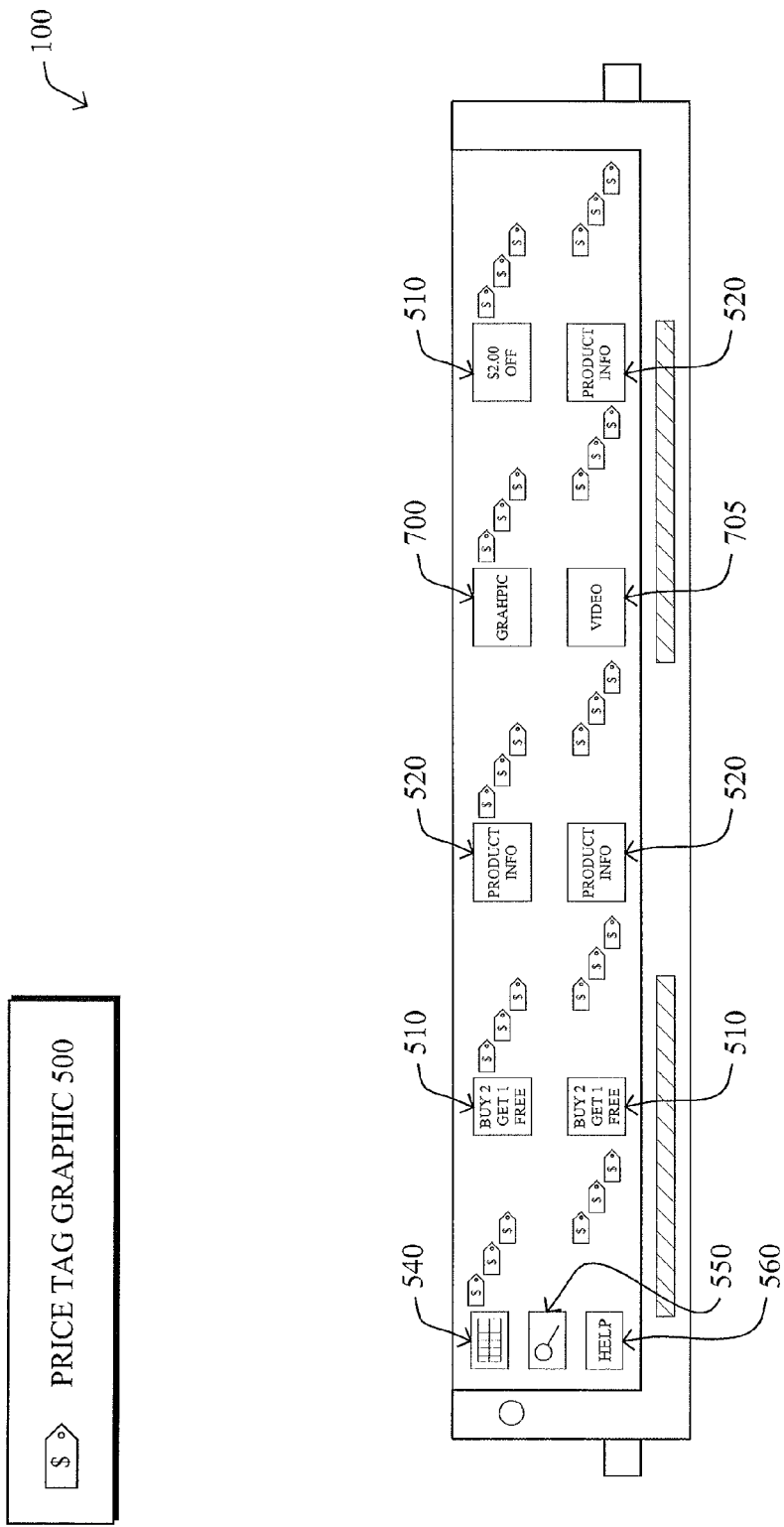
FIG. 7 illustrates an example digital display when used in suggestive selling mode.

Another example of a possible service mode, which can be used on its own or in addition to the price tag mode or guidance/tour mode described above, is a suggestive selling mode. Certain items at particular stores are often purchased together, and reminder graphics can be placed with one item's price tag icon identifying additional items that the customer may be interested in. For example, in a home improvement store, a customer buying PVC pipe fittings may be reminded to also buy PVC glue, and be automatically guided to its exact shelf location. Similarly, in a grocery store, a customer buying canned pumpkin is probably baking a pie and could be offered an email of a recipe, and be guided to the locations of the rest of the ingredients. In suggestive selling mode, control computer 300 can use suggestive selling process 480 to prepare and send graphics/video 460 information for display by digital displays 100, which can be included with the information described above in the price tag mode. As shown in FIG. 7, based on the graphics/video 460 information sent by control computer 300, digital displays 100 can display suggestive selling graphics 700 or suggestive selling videos 705, which can be displayed in the space between price tags, or any other open space on digital displays 100, and direct customers to additional items that may be of interest.

If digital displays 100 include a touch interface, the system can be configured so that a user can select a suggestive selling graphic 700 and be directed to the additional item as described in the guidance/tour mode above.

Video Help Mode

Another example of a possible service mode, which can be used on its own or in addition to the price tag mode described above, is a video help mode. Upon request by the customer, a pre-recorded video can be displayed on digital displays 100 that provides the user with additional information about a particular product, such as suggestions on how to cook an item, suggested recipes, use instructions, advertisements for the item, etc. In video help mode, the displays are configured to accept an input from the customer indicating that the customer is requesting additional information or help. For example, the displays on digital displays 100 could be set up such that a customer can double click on the price tag graphic 500 described above in price tag mode to obtain the additional information, a separate icon can be provided to obtain the additional information, a touch screen gesture can be detected to obtain additional information, or any other desired input method. Digital display 100 would send this customer input information to control computer 300, which would use help process 485 determine the additional information being requested and prepare and send graphics/video 460 information for display by digital displays 100. As mentioned above, the graphics/video 460 information sent by control computer 100 to digital displays 100 in response to the customer request could be a video showing suggestions on how to cook an item, a video advertisement, etc. Alternatively, the graphics/video 460 information could also be a graphic or text showing a particular recipe using the item or could be a QR code, which the customer could scan using a mobile device, such as a smart phone or tablet, to receive additional information about the product to take home on their digital device.

Inventory Mode

Another example of a possible service mode is an inventory mode, which can be used by employees of the store. In inventory mode, during inventory time, control computer 300 can use inventory process 490 to send requests to all of the digital displays 100 to return an image of the shelving unit across from the particular digital display. Digital displays 100 would then use cameras 115 to obtain the image and send the image back to control computer 300. Assuming that all of the shelving units in the store have a digital display 100 across from them, control computer 300 would then have a full image of all of the shelving units in the store. Using recognition programs, which are well known in the art, the images received from digital displays 100, and inventory/price information 461 regarding which products are located on which shelving units, control computer 300 can determine the how many products are left on each shelving unit. Employees could them simply validate the counts from control computer 300, which can result in time and cost savings for the employer.

In addition to taking inventory, restocking activities could use guidance/tour mode to improve their efficiency. For example, rather than a customer entering a desired item or list of items, the employee can enter an item or list of items to be stocked and be guided to the exact shelving unit and shelf where the product should be located, as described above. Similarly, if shelves are to be reconfigured to move products around, the guidance/tour mode could be used to guide the employees through each step of the reconfiguration process.

Ad Rental Mode

Another example of a possible service mode, which can be used on its own or in additional to the price tag mode or guidance/tour modes described above, is an ad rental mode. Space on digital displays not being used to display product information or to guide customers around the store could be rented out to manufacturers/distributors of the products on nearby shelves. For example in the soft drink or snack aisle of a grocery store, the highly competitive manufacturers of the products sold there could bid on video display space, and pay for it by the square inch. In ad rental mode, control computer 300 can use ad process 495 to send graphic/video 460 information to digital displays 100 that would instruct digital displays 100 to display a particular graphic and/or video advertisement for a product, as specified by its manufacturer or distributor.

Figure 8:
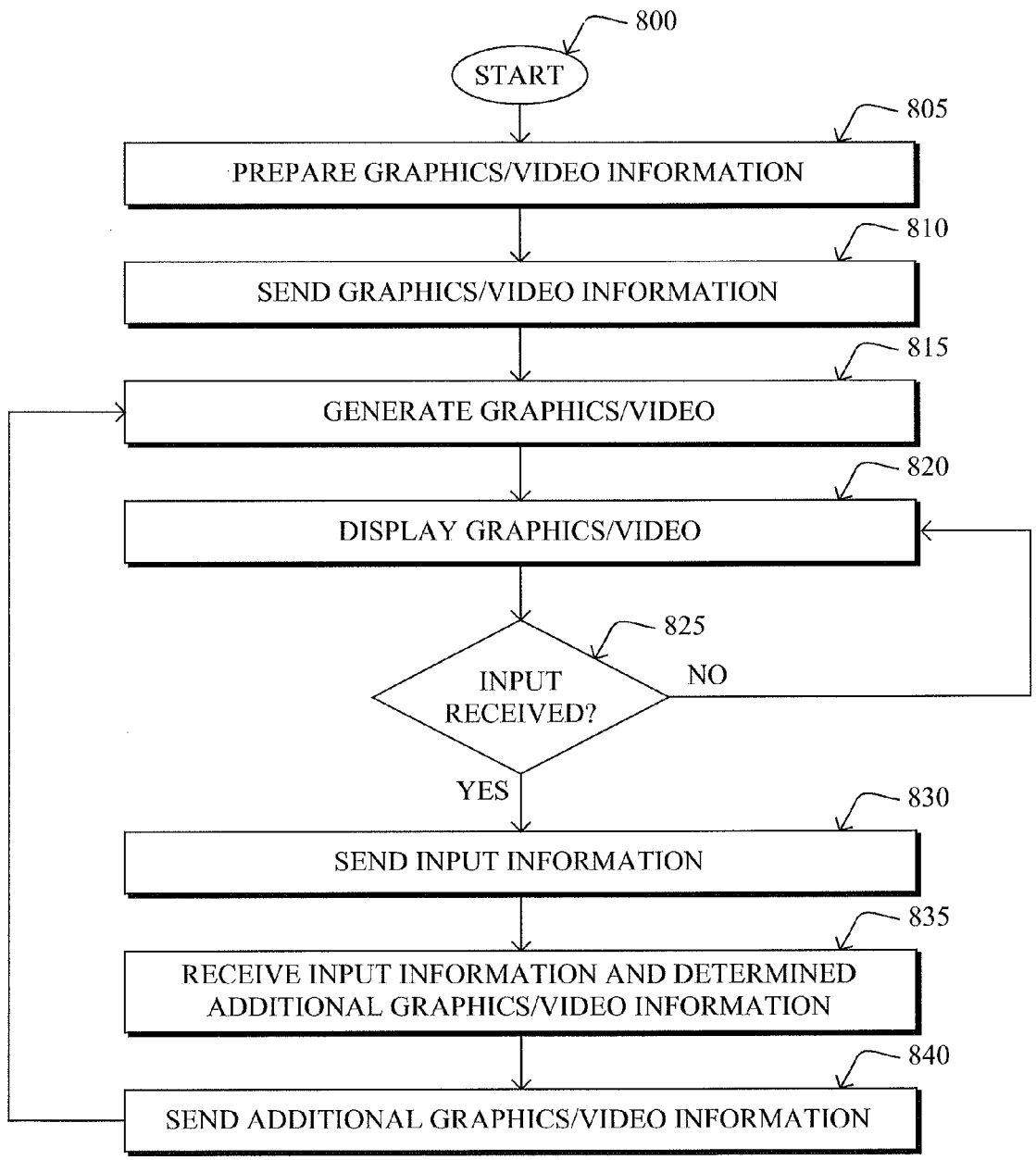
FIG. 8 illustrates an example simplified procedure for using retail digital signage price tag mode.

FIG. 8 illustrates an example simplified procedure for operating in price tag mode in accordance with one or more embodiments described herein. The example process starts at step 800 and at Step 805 control computer 300 prepares graphics/video information using inventory/price information 461 to send to digital displays 100. As discussed above, the graphics/video information could be information required in order to display product information, such as product names, logos, and prices, special offer information, manufacturer coupon information, promotion information, social networking tie-in information, full motion video advertisements, various icons, such as keyboard, interactive, and help icons, etc. In addition, if suggestive selling mode is being used, the graphics/video information could include information identifying additional items that the customer may be interested in, or, if ad rental mode is being used, the graphics/video information could include information regarding graphic and/or video advertisements for a product. Graphics/video 460 information may be stored in compressed or raw data state, in which case processor 420 can perform decompression or rendering processes to convert the stored data to graphics/video. Further, control computer 300 can arrange the graphics/video in a buffer with correct order, position, and orientation such that the images are transmitted to the correct one of digital displays 100, taking into account which digital displays 100 are connected to which media players 320, and their order on the daisy chain.

Once the graphics/video information has been prepared, control computer 300 sends the information at Step 810. If a media player 320 is being used in the system, control computer 300 can send the information to media player 320. If media player 320 is not being used, control computer 300 can send the information directly to digital displays 100.

At Step 815, once the graphics/video information is received, either by media player 320 or digital displays 100, the graphics/video to be displayed are generated and are displayed on the particular digital displays 100 at Step 820.

If digital displays 100 are equipped with touch interfaces or some other input device, the process can continue with Step 825, in which the digital displays 100 determine if there has been an input by the customer, such as selecting a displayed price tag to receive additional product information, selecting a keyboard, interactive, or help icon, etc. If there has not been any customer input, digital displays 100 continue to display the videos/graphics. If there has been a customer input, at Step 830, digital displays 100 send information regarding the customer input to control computer 300, either directly or through media players 320, if used. Alternatively, rather than a customer input, the input received at Step 825 could also be a change in the data or algorithms stored in memory 430, such as the price or description of a particular item. In this case, in Step 835 control computer 300 could process a refresh order using management process 497 an refresh the graphics/video to be sent to digital displays.

Control computer 300 receives the input information at Step 835 and determines additional graphics and/or video information that may be required based on the customer input. For example, if the input information indicates that the customer has selected a price tag and requested additional product information, control computer 300 can prepare the graphics/video information required to display the additional requested information. Similarly, if the input information indicates that the customer has requested help, control computer 300 can prepare the graphics/video information required to display a help video. If the input information indicates that the customer has selected a product based on a suggestive selling graphic, control computer can direct the customer to the suggested item using the guidance/tour mode described herein.

Once control computer 300 has determined the additional graphics/video information required, at Step 840 control computer 300 sends the additional graphics/video information to digital displays 100, either directly or through media players 320, and the process continues with Step 815.

Figure 9:
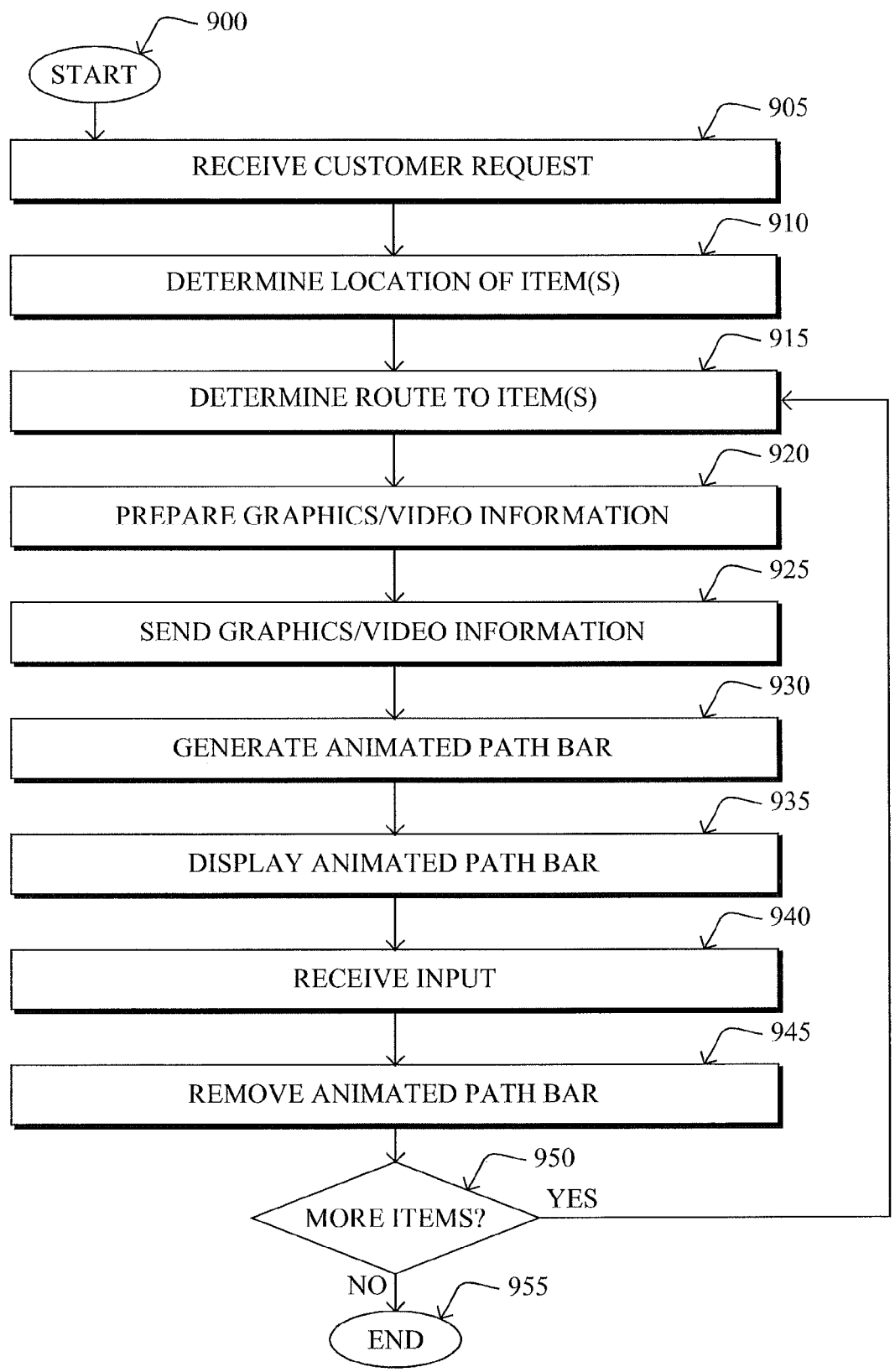
FIG. 9 illustrates an example simplified procedure for using retail digital signage in guidance/tour mode.

FIG. 9 illustrates an example simplified procedure for operating in guidance/tour mode in accordance with one or more embodiments described herein. The example process starts at step 900 and at Step 905 control computer 300 receives a customer request for the location of an item, a list of items, or a particular category or type of item. As discussed above, the customer request could come from an input by the customer at a digital display 100, welcome kiosk 340, a website or app on a smartphone, selection of a suggestive selling graphic, etc.

When a request is received, control computer 300 can determine the location of the item, or items if a list or category/type was requested, at Step 910 using inventory/price information 461 and determine a route through the store to the item(s) at Step 915. Depending on the particular item(s) requested and/or the preferences of the retailer, the route determined by control computer 300 to the item(s) could be the most efficient/direct route to locate the item(s). Alternatively, the route could also be determined to bring the customer past an aisle with a special promotion, past an aisle that may have items that control computer 300 determines the customer may be interested in based on the item(s) that were requested, etc.

Once the route has been determined, at Step 920 control computer 300 prepares graphics/video information to send to digital displays 100. As discussed above, the graphics/video information could be an animated path bar 600 that can be displayed on digital displays 100 between the customer's location and the location of the requested item(s).

Once the graphics/video information has been prepared, control computer 300 sends the information at Step 925. If a media players 320 are being used in the system, control computer 300 can send the information to media players 320. If media players 320 are not being used, control computer 300 can send the information directly to digital displays 100 along the path being indicated for the customer.

At Step 930, once the graphics/video information is received, either by media players 320 or digital displays 100, the animated path bar 600 is generated and displayed on the particular digital displays 100 at Step 935.

At Step 940, control computer 300 receives an input indicating that the customer has located the requested item, if only one item was requested, or has located one of the items on the list, if multiple items were requested. As discussed above, this input could be received from digital displays 100 indicating that the customer has selected a located icon 605 or a price tag graphic 500 to alert control computer 300 that the item has been located. Alternatively, the input could be an indication from a security camera 300 or a camera 115 in a nearby digital display 100 indicating that the customer has reached the desired location of the particular item. Once control computer 300 receives this input, at Step 945 control computer 300 sends information to digital displays 100 instructing them to remove the animated path bar 600 previously displayed.

At Step 950, control computer 300 determines if there are additional items requested by the customer that have not been located. If there are no additional products, the process ends at Step 955, where the customer can be directed to a checkout. If there are additional products, the process continues with Step 915 and the route to the next product is determined by control computer 300.

Figure 10:
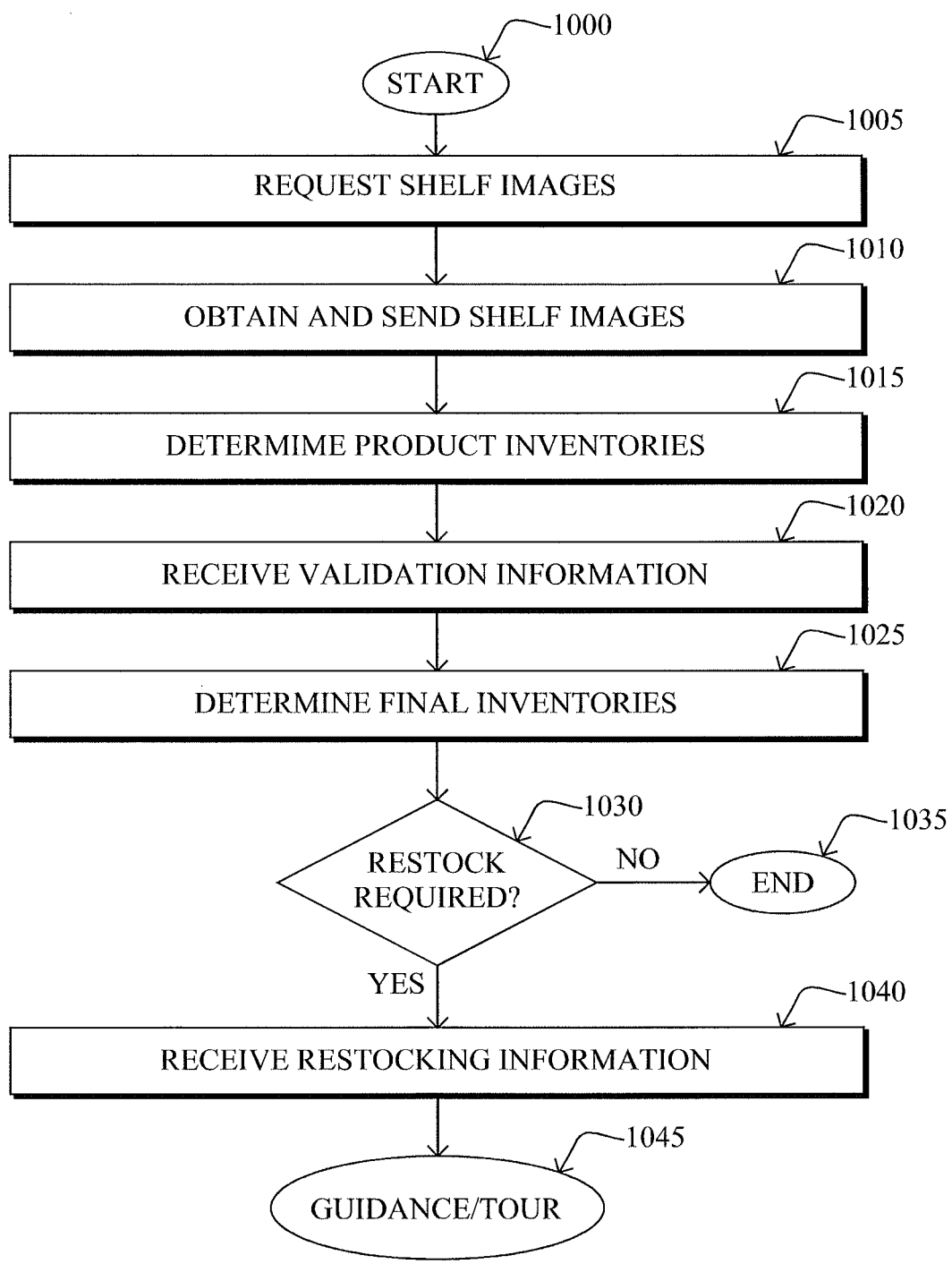
FIG. 10 illustrates an example simplified procedure for using retail digital signage in inventory mode.

FIG. 10 illustrates an example simplified procedure for operating in inventory mode in accordance with one or more embodiments described herein. The example process starts at step 1000 and at Step 1005 control computer 300 sends requests to digital displays 100 for images of the shelving units across from the particular digital displays 100. At Step 1010, digital displays 100 use cameras 115 to obtain the requested images and send the images back to control computer 300.

Based on the images received from digital displays 100, and inventory/price information 461 regarding the items that should be on each shelf, at Step 1015 control computer 300 determines the product inventories on each shelf using a recognition program or other well known methods. Once control computer 300 has determined the product inventories, the store employees can verify the product inventory determined by control computer 300 and input the validated product inventory information, which is entered using input devices on digital displays 100, and received by control computer at Step 1020. Based on the product inventory determined by control computer 300 and the validated product inventory received, control computer 300 can then determined a final inventory for each item at Step 1025.

If used for restocking, in addition to inventory, at Step 1030 control computer 300 can determine if restocking or reordering of any particular items are required. For example, if a final inventory shows that a particular product is sold out or a final inventory shows that a particular item has fallen below a predetermined inventory number, the system can be used to assist the employees with restocking of items. If it is determined that restocking is not required, the process ends at Step 1035. If it is determined that restocking of one or more items is required, control computer 300 provides an alert and at Step 1040 receives restocking information, such as the products being restocked and the number of products being put out on the shelves. In addition, at Step 1045, control computer 300 could initiate guidance/tour mode 1045, as described above, to guide the employees to the shelves where particular products should be restocked.

It should be noted that while certain steps within procedures 800-1000 may be optional as described above, the steps shown in FIGS. 8-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-1000 are described separately, certain steps from each procedure may be incorporated into each other procedure, and the procedures are not meant to be mutually exclusive.

While there have been shown and described illustrative embodiments that provide for retail digital signage systems and various service modes that can be used with these system, it is to be understood that various other adaptations and modifications may be made within the spirit and scope of the embodiments herein. The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
   a control computer connected to a plurality of digital displays, the control computer including:
   a processor configured to execute one or more processes; and
   a memory configured to store a process executable by the processor, the process when executed operable to:
   prepare graphics information for a set of pixels of a media player not in the plurality of digital displays, the graphics information including an identification of a retail product and a price for the retail product that are associated with a subset of the set of pixels; and
   send the graphics information to the plurality of digital displays, wherein each of the plurality of digital displays has a different amount of pixels than that of the set of pixels of the media player not in the plurality of digital displays;
   wherein a particular one of the plurality of digital displays is configured to identify the subset of pixels as assigned to the particular one of the plurality of digital displays and, in response, display the identification of the retail product and the price of the retail product.

2. The system of claim 1, wherein the particular one of the plurality of digital displays comprises at least one of an aspect ratio of 16:1, a pixel array of 1920×120, or a display area having a height of approximately 3 inches and a width of approximately 48 inches.

3. The system of claim 1, wherein:
   the graphics information further comprises predetermined multimedia associated with the subset of pixels, the multimedia comprising at least one of: a special offer graphic, a promotional graphic, a product information graphic, a recipe suggestion, or a full motion video advertisement; and
   the particular one of the plurality of digital displays is configured to display the predetermined multimedia based on the graphics information.

4. The system of claim 1, wherein:
   the graphics information further comprises a predetermined graphic associated with the subset of the set of pixels, the predetermined graphic comprising at least one of: a keyboard icon, an interactive icon, or a help icon; and
   the particular one of the plurality of digital displays is configured to display the predetermined graphic based on the graphics information.

5. The system of claim 1, wherein:
   the graphics information further comprises predetermined multimedia associated with the subset of the set of pixels, the multimedia comprising at least one of: a suggestive selling graphic or a suggestive selling video; and
   the particular one of the plurality of digital displays is configured to display the predetermined multimedia based on the graphics information.

6. The system of claim 1, wherein the process when executed further operable to:
   receive a customer input;
   prepare additional graphics information based on the customer input, the additional graphics information comprising supplemental information for the retail product; and
   send the additional graphics information to the plurality of digital displays,
   wherein the particular one of the plurality of digital displays is configured to display the supplemental product information based on the additional graphics information.

7. The system of claim 6, wherein the supplemental product information comprises at least one of: a price per unit, a barcode number, nutritional information, an expiration date, a product warning, or a recommendation.

8. The system of claim 1, wherein the plurality of digital displays are arranged in a daisy chain of displays.

9. The system of claim 8, wherein the particular one of the plurality of digital displays is configured to identify the subset of the set of pixels based on a configuration setting indicative of a position of the particular digital display in the daisy chain of displays.

10. The system of claim 9, wherein the identified subset of the set of pixels corresponds to a line of pixels of the digital display not in the plurality of digital displays.

11. A method, comprising:
  preparing, by a processor, graphics information for a set of pixels of a media player that is not in a plurality of digital displays, the graphics information comprising an identification and a price for a retail product that are associated with a subset of the set of pixels; and
  sending, by the processor, the graphics information to the plurality of digital displays, wherein each of the plurality of digital displays has a different amount of pixels than that of the set of pixels of the media player not in the plurality of digital displays;
  wherein a particular one of the plurality of digital displays is configured to identify the subset of pixels as assigned to the particular one of the plurality of digital displays and, in response, display the identification of the retail product and the price of the retail product.

12. The method of claim 11, wherein the particular one of the plurality of digital displays comprises at least one of: an aspect ratio of 16:1, a pixel array of 1920×120, or a display area having a height of approximately 3 inches and a width of approximately 48 inches.

13. The method of claim 11, wherein the graphics information associated with the identified subset of pixels further comprises at least one of: a special offer graphic, a promotional graphic, a product information graphic, a recipe suggestion, or a full motion video advertisement.

14. The method of claim 11, wherein the graphics information associated with the identified subset of pixels further comprises at least one of: a keyboard icon, an interactive icon, or a help icon.

15. The method of claim 11, wherein the graphics information graphics information associated with the identified subset of pixels further comprises at least one of: a suggestive selling graphic, a suggestive selling icon, or a predetermined graphic.

16. The method of claim 11, further comprising:
  receiving a customer input;
  preparing additional graphics information for one of the digital displays using the processor based on the customer input, the additional graphics information comprising supplemental product information for the retail product; and
  sending the additional graphics information to the plurality of digital displays, wherein the particular one of the plurality of digital displays is configured to display the supplemental product information in the additional graphics information.

17. The method of claim 16, wherein the supplemental product information comprises at least one of: a price per unit, a barcode number, nutritional information, an expiration date, a product warning, or a recommendation.

18. The method of claim 11, wherein the plurality of digital displays are arranged in a daisy chain of displays.

19. The method of claim 18, wherein the particular one of the plurality of digital displays is configured to identify the subset of the set of pixels based on a configuration setting indicative of a position of the particular digital display in the daisy chain of displays.

20. The method of claim 19, wherein the identified subset of the set of pixels corresponds to a line of pixels of the digital display not in the plurality of digital displays.

* * * * *